April 28, 1970     W. S. OAKES ET AL     3,509,527
GUIDANCE SYSTEMS FOR DIRECTING THE DRIVER OF A CAR
ALONG A PRESCRIBED PATHWAY
Filed Oct. 12, 1965     3 Sheets-Sheet 2
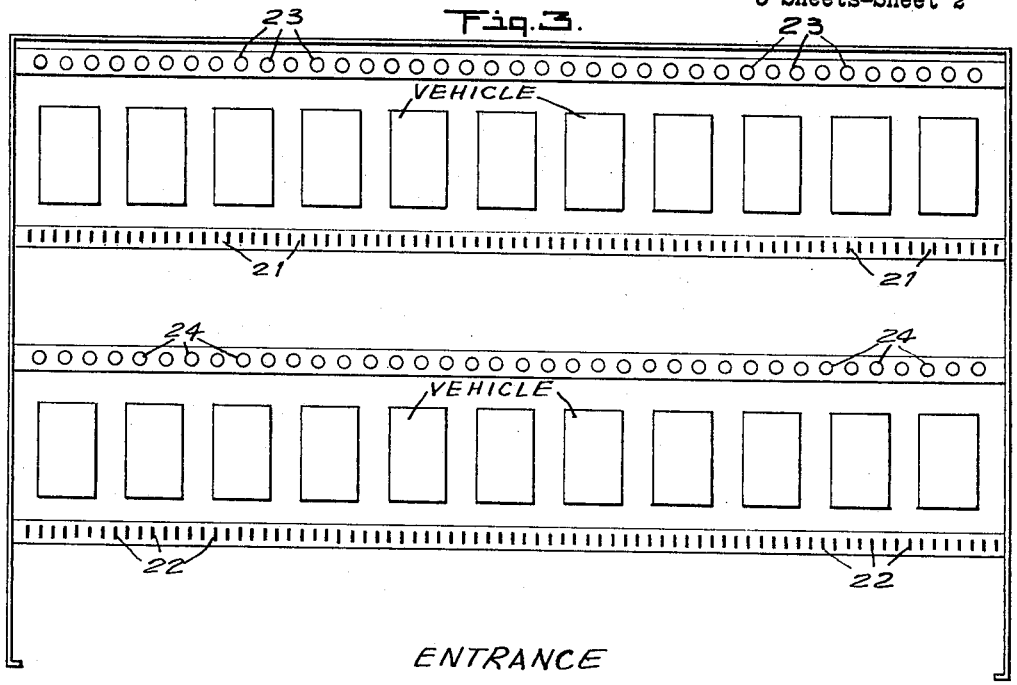
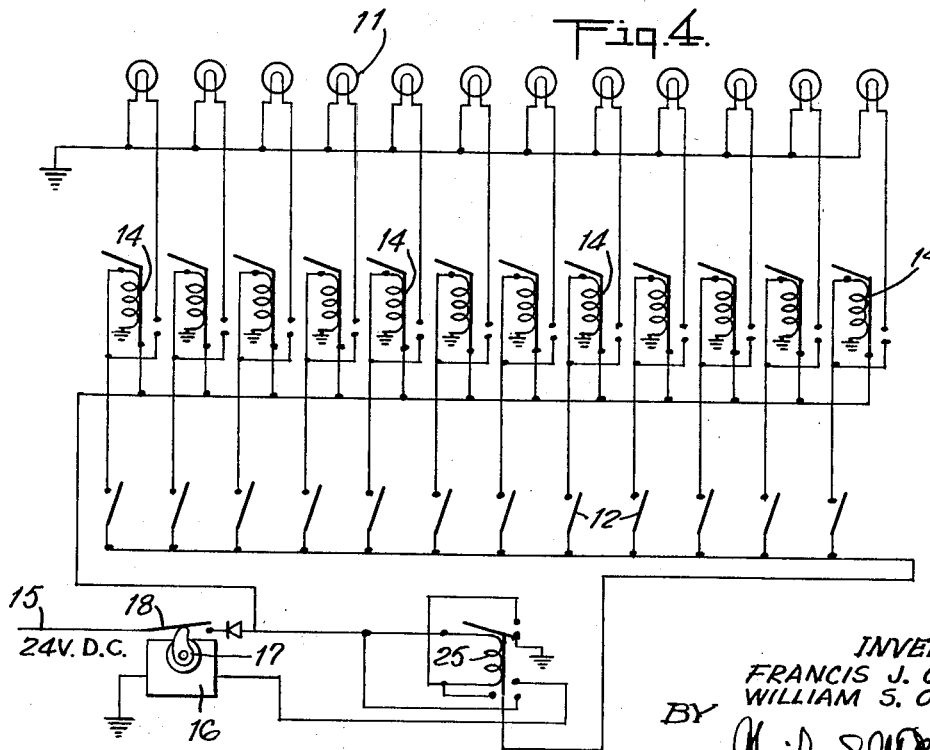
INVENTORS.
FRANCIS J. OAKES
WILLIAM S. OAKES
BY
ATTORNEY

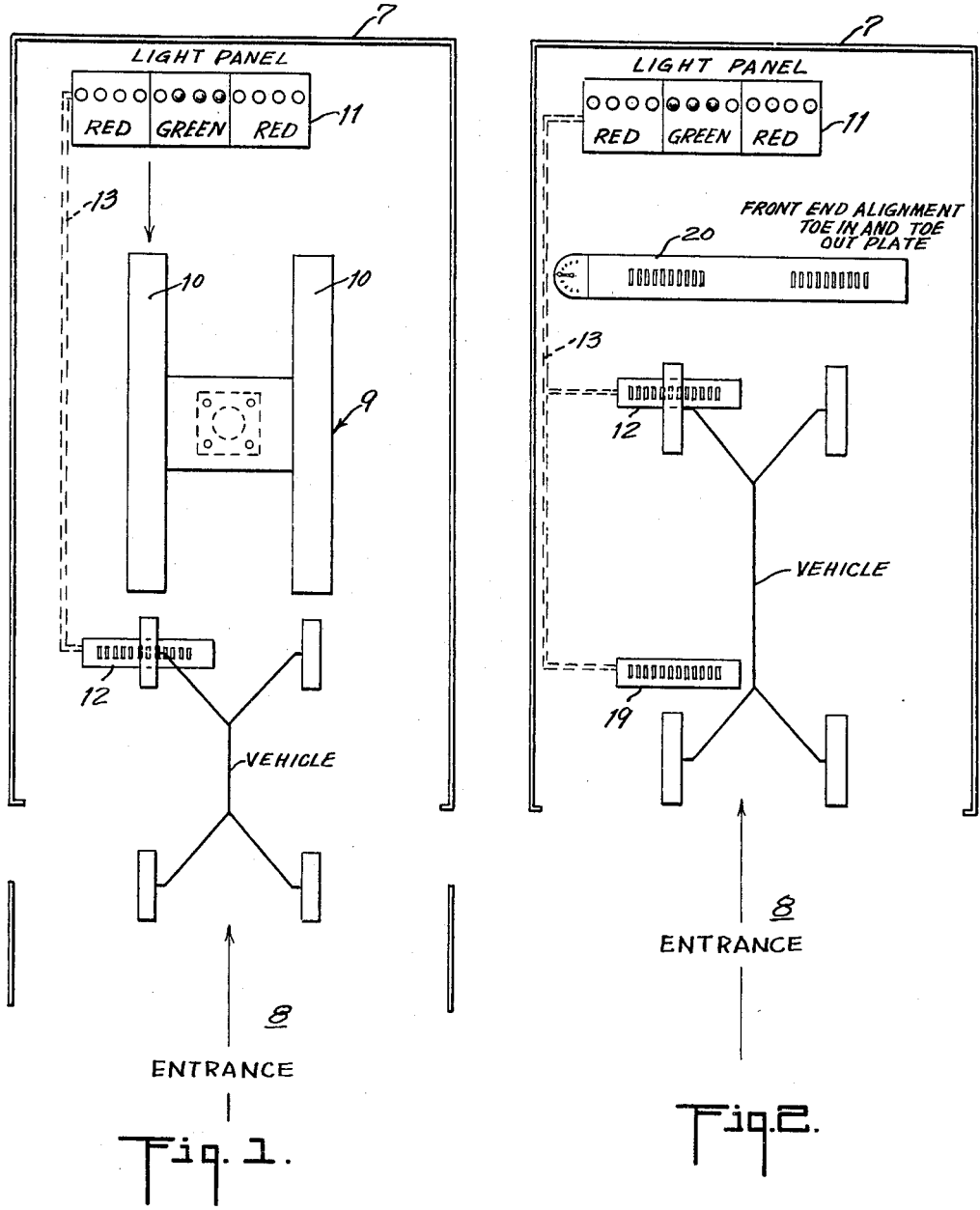

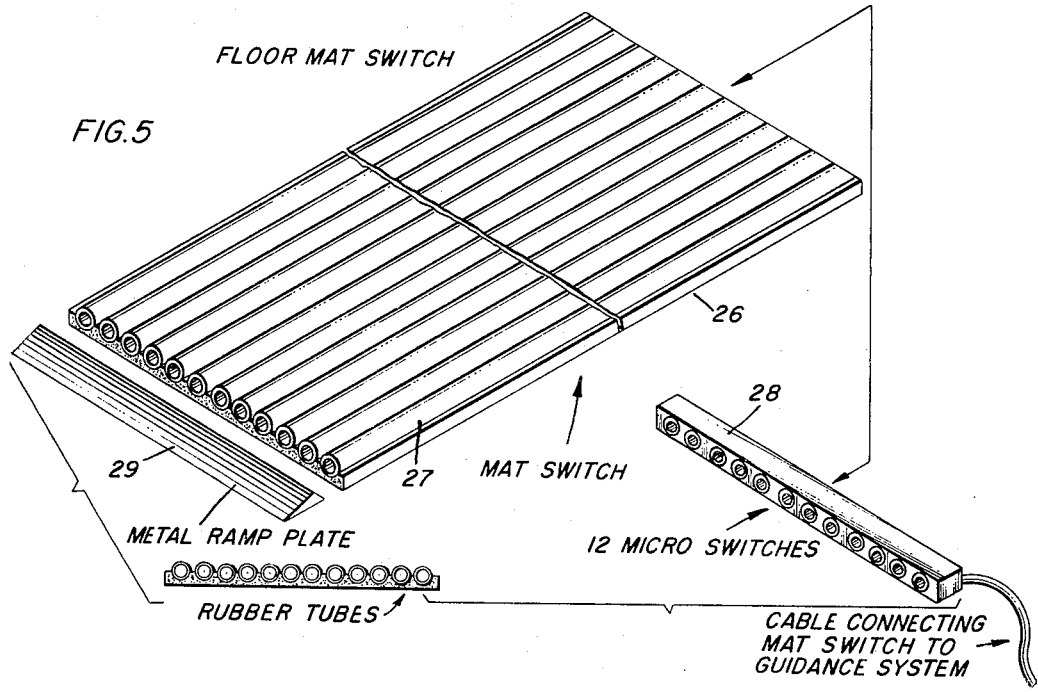
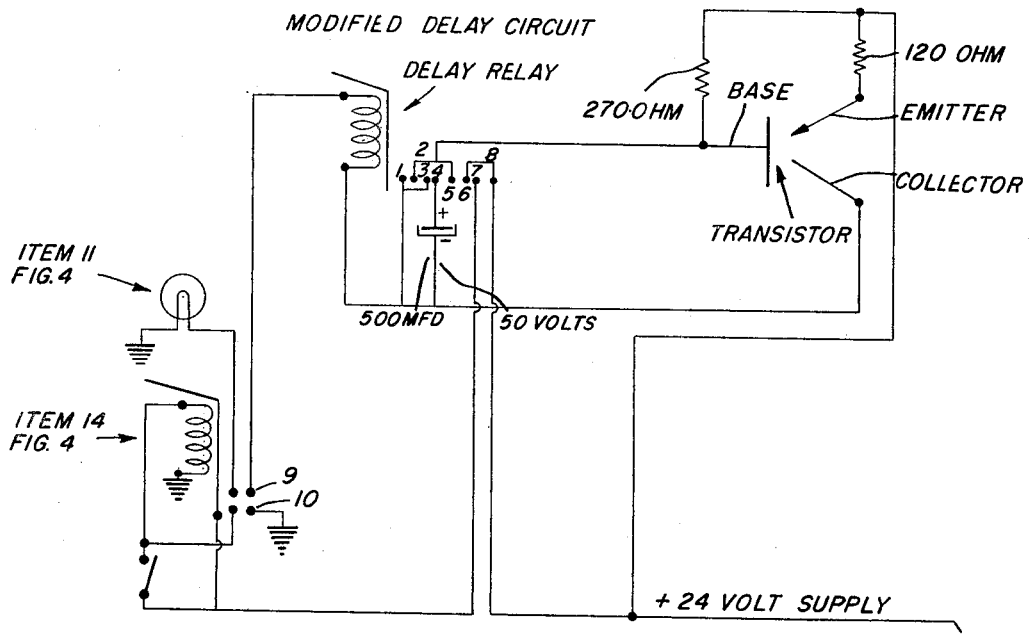

United States Patent Office 3,509,527
Patented Apr. 28, 1970

3,509,527
GUIDANCE SYSTEMS FOR DIRECTING THE DRIVER OF A CAR ALONG A PRESCRIBED PATHWAY
William S. Oakes, 23 Terseyville Ave., Freehold, N.J. 07728, and Francis J. Oakes, Rte. 2, Box 123, Farmingdale, N.J. 07727
Filed Oct. 12, 1965, Ser. No. 495,070
Int. Cl. G08g 1/14
U.S. Cl. 340—51            4 Claims

ABSTRACT OF THE DISCLOSURE

A row of visual signals are connected in a circuit to a series of floor switches said visual signals being actuated by contact of the wheels of a vehicle with said series of floor switches to show the operator of a vehicle the direction the vehicle is headed.

---

The invention herein disclosed relates to the guidance of vehicles into restricted areas or along definitely limited lines, such as for example, driving a car onto the lift in a service station.

Objects of the invention have been to provide a simple, practical system by which the operator of a vehicle would be guided and directed automatically, without need of explanation or previous experience.

Accordingly, the invention embodies in one example, a row of floor switches placed to be engaged by the tires on an approaching car and connected to energize lamps or other such indicators placed in view of the operator and showing visually the direction in which the vehicle is headed and possible need for any correction.

Other desirable objects accomplished and further novel features of the invention are set forth and will appear in the course of the following specification.

The drawings accompanying and forming part of the specification illustrate certain presently preferred forms of the invention, but it will be appreciated that structure and arrangement may be further modified and changed all within the true intent and scope of the invention as hereinafter defined and claimed.

FIG. 1 in the drawings is a diagrammatic plan view illustrating one practical embodiment of the invention.

FIG. 2 is a plan view of another form of the invention, designed particularly to assure accurate lining up of a vehicle with the trackways of a lift, frame machine or the like.

FIG. 3 is a plan of another embodiment designed to meet mass parking requirements.

FIG. 4 is a wiring diagram for the system.

FIG. 5 is a diagrammatic view showing parts of a modified form of floor switch, in separated relation.

FIG. 6 is a wiring diagram of a modified form of transistorized delay circuit.

In FIG. 1, a service station of any usual or special construction is indicated at 7, having an entranceway 8, leading to a car lift 9, shown as having guides 10 for directing the car into proper position over the lift.

According to this invention, the operator of such a car is automatically informed and directed by a row of position indicating lights 11, located on a wall or other support in convenient view of the driver, in line with the proper travel of the vehicle and energized individually and selectively from a row of floor switches 12, placed transversely across the path of an entering car.

These may be sturdy watertight switches operable by the tire of a car and connected by wiring 13, in a protected cable, with the individual switches connected with correspondingly placed signal lights.

In a practical installation, twelve switches to a row have been used, placed an inch apart and the indicator lamps substantially in alignment with the actuating switches, except that for practical reasons the lamps may be spaced a somewhat greater distance apart.

The floor switches may be of a size and extent to have about four or six of them operable by a tire riding over the row of switches.

To give a definite warning as well as the directional guidance, the lamps at opposite ends of the signal group may be red and the intermediate, safe indicating lamps be green in color.

The connections from the controlling switches to the indicating lamps may include holding or sustaining relays; as indicated at 14, in the wiring diagram, arranged to connect the lamps direct to the current supply 15, independently of the switches. This assures that the lamps will signal when the corresponding switches are engaged by the car tire and will hold on for a suitable signal period.

The length of such signalling indication is determined in the present disclosure by a delay motor 16, cut into operation by the relays and operating a cam 17 for a circuit interrupter 18.

By gearing or otherwise, this motor may interrupt the signal circuit after a pre-determined period, such as for about four to six seconds.

Where it is essential for the back wheels of an entering car to be accurately lined up with the front wheels, the invention contemplates the provision of a second row of floor switches 19, FIG. 2, in line with the first row and placed to be actuated by the rear wheels just after the first row of switches has been engaged by the tire of the same side front wheel.

The two rows of duplicate switches are shown connected in parallel with the indicating lights to which they are assigned so as each to operate the same correspondingly placed signal lamp.

Instead of connecting the two rows of switches in tandem with the same row of indicators, there may be a row of indicators for each set of switches, placed one below the other to more fully visualize the position of the car wheels.

This form of the invention may be used for front end alignment toe in and toe out plates, such as indicated at 20, where it is necessary that the vehicle approach in "square" with the machine. Otherwise the toe reading will not be true and may vary up to 30 slip feet per mile.

With installation of the two sets of floor switches squared with the machine, the vehicle will be directed to approach in square at all times, with only the one operator.

This particular system is of help with other equipment requiring square approach.

For mass parking, the floor switches and companion indicating signals may be arranged as shown in FIG. 3, with the floor switches in continuous rows, 21, 22, in front of the stalls or locations of the cars and the companion signal lamps in continuous panels 23, 24.

Both switches and panels thus could be made on a continuous run, for parking vehicles where floor space is limited, thus particularly designed for truck and bus terminals, and for parking aircraft where each unit has a designated area.

The light indicators in the control panels can be of different colors or display numbers.

The invention is also useful for narrow approaches to bridges, tunnels, loading platforms and the like.

The light panels may be constructed to hold the control equipment, thus enabling a complete system to be installed by proper placing of this panel and correspondingly locating the floor switches.

The use of holddown relays as shown at 14 in FIG. 4 is advantageous.

As a vehicle depresses a floor contact switch or switches, a relay or relays is or are energized to change contact over from say 24 volt supply from the floor switches direct to 24 volt local supply which allows the floor switches to open while the relay is still holding the panel lamps lighted.

The delay motor relay 25 is in series with all switches and relays so as to start the delay motor whenever a relay is energized.

The system is relatively simple and inexpensive, for what it accomplishes, and in effect is self-explanatory, showing to the operator the results effected in the steering of a vehicle into a selected place.

One of the possible modifications contemplated by the invention is in the form of the floor switches.

These switches are shown in FIG. 5 as made up in the form of a flat pad 26, of compressible tubes 27, in close side-by-side parallel relation, aligned in the direction of automobile travel, in engagement at their ends with microswitches 28, connected individually with the directional signals in alignment with the same.

The delay or holding effect may be accomplished by a transistorized delay circuit, such as illustrated in FIG. 6.

The padlike form of switch shown in FIG. 5, designed to be laid flat on the floor, may be provided with a ramp 29, at the entrance end, but this is not necessary when the pad is sunk in the floor.

An advantage of this form of switch is that no delay unit is necessary since the tubes may be of sufficient length to give proper directional indication of progress of wheel passing over the same.

Referring to FIG. 6 when the delay relay is in open circuit position, contacts 1 and 2 of the delay relay are closed, allowing 24 volts through transistor circuit and delay relay coil. Extra set of contact points 9 and 10 are added to each of the relays, such as 14, shown in FIG. 4, connected in parallel.

As any one or more floor switches, such as 12, in FIG. 1, is or are closed, contacts 9 and 10 close, completing B— circuit for delay relay, requiring it to energize. Contacts 1 and 2 open, contacts 5 and 4 close, connecting 500 mfd. condenser in series with base connection of transistor and high side of relay coil. As long as condenser is charging sufficiently, current is drawn through delay coil to hold it down. As condenser reaches full charge, insufficient current is flowing through delay coil, causing it to open up. As delay relay opens B+ 24 volt supply to relay 14 is interrupted momentarily by points 6, 7 and 8, breaking and making again.

This enables all relays, item 14, FIG. 4, to go back to open position ready for another cycle.

Also contacts 3 and 4, FIG. 6, close, discharging the condenser ready to start next delay cycle.

Delay time of this particular circuit can be varied from 1 to 10 seconds, by substituting 750 ohm variable resistor between B+ and emitter connection of transistor in place of 120 ohm resistor, shown in FIG. 6.

What is claimed is:
1. A guidance system comprising
 a row of floor switches arranged transversely across the intended path of an approaching vehicle,
 a row of directional signals correspondingly placed transversely across the path of such a vehicle in front of and in view of an operator of such a vehicle and
 connections from the individual floor switches to the companion correspondingly placed direction signals, including
 timing devices for holding said directional signals energized a predetermined time after the initial energization from said floor switches,
 said signals comprising a horizontally extended row of lamps connected to flash on in succession in the direction corresponding to the direction of travel of a vehicle actuating said floor switches.

2. The invention according to claim 1 with a second row of floor switches arranged transversely of the intended path of the vehicle in direct line with said first mentioned floor switches and located to be engaged by a rear wheel when a front wheel of the vehicle has made engagement with the first mentioned row of floor switches, with electrical connections extending from said second row of floor switches in parallel with the connections from the first row of floor switches.

3. The invention according to claim 1 in which said connections and timing devices include self-holding relays for switching said directional signals to a supply source independent of said floor switches.

4. The invention according to claim 1 in which said connections and timing devices include self-holding relays for switching said directional signals to a supply source independent of said floor switches and said timing devices include a delay motor under control of said relays.

References Cited

UNITED STATES PATENTS

| | | | |
|---|---|---|---|
| 2,979,694 | 4/1961 | Lamberti | 200—61.44 XR |
| 3,020,005 | 2/1962 | Stockwell | 340—31 XR |

ALVIN H. WARING, Primary Examiner

U.S. Cl. X.R.

200—86; 340—23, 37, 282